US012212151B2

(12) United States Patent
Vijayan et al.

(10) Patent No.: US 12,212,151 B2
(45) Date of Patent: *Jan. 28, 2025

(54) CONTACTLESS POWER TRANSFER SYSTEM AND METHOD FOR CONTROLLING THE SAME

(71) Applicant: GE Intellectual Property Licensing, LLC, Niskayuna, NY (US)

(72) Inventors: Pradeep Vijayan, Bangalore (IN); Rajendra Naik, Bangalore (IN); Arun Kumar Raghunathan, Bangalore (IN); Vishnu Mahadeva Iyer, Raleigh, NC (US)

(73) Assignee: Dolby Laboratories Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,287

(22) Filed: Sep. 18, 2023

(65) Prior Publication Data
US 2024/0006917 A1 Jan. 4, 2024

Related U.S. Application Data

(63) Continuation of application No. 17/707,819, filed on Mar. 29, 2022, now Pat. No. 11,764,609, which is a
(Continued)

(51) Int. Cl.
*H02J 50/10* (2016.01)
*H02J 50/80* (2016.01)
*H02J 50/12* (2016.01)

(52) U.S. Cl.
CPC .............. *H02J 50/10* (2016.02); *H02J 50/80* (2016.02); *H02J 50/12* (2016.02)

(58) Field of Classification Search
None
See application file for complete search history.

(56) References Cited

U.S. PATENT DOCUMENTS

| 5,896,278 A | 4/1999 | Tamura et al. |
| 8,129,864 B2 | 3/2012 | Baarman et al. |

(Continued)

FOREIGN PATENT DOCUMENTS

| EP | 2244351 | 10/2010 |
| JP | 2007336717 | 12/2007 |

(Continued)

OTHER PUBLICATIONS

"Chinese Application No. 201611176286 Decision on Rejection", Jun. 25, 2021, 14 pages.
(Continued)

*Primary Examiner* — Jared Fureman
*Assistant Examiner* — Aqeel H Bukhari
(74) *Attorney, Agent, or Firm* — DeLizio, Peacock, Lewin & Guerra, LLP

(57) ABSTRACT

A contactless power transfer system is provided. The contactless power transfer system includes a first power exchanger coil configured to exchange power. The contactless power transfer system also includes a first power converter operatively coupled to the first power exchanger coil and configured to convert a direct current power to an alternating current power at a system frequency. The contactless power transfer system further includes a controller configured to control an operating state of the first power converter to vary an alternating current power provided to the first power exchanger coil at the system frequency.

18 Claims, 8 Drawing Sheets

Related U.S. Application Data continuation of application No. 15/375,789, filed on Dec. 12, 2016, now Pat. No. 11,303,156.

(56) References Cited

U.S. PATENT DOCUMENTS

| | | | |
|---|---|---|---|
| 8,593,105 B2 | 11/2013 | Baarman et al. | |
| 8,664,801 B2 | 3/2014 | Abe | |
| 11,303,156 B2 | 4/2022 | Vijayan et al. | |
| 11,764,609 B2 * | 9/2023 | Vijayan | H02J 50/80 307/142 |
| 2010/0109445 A1 | 5/2010 | Kurs et al. | |
| 2010/0270867 A1 | 10/2010 | Abe | |
| 2010/0277121 A1 | 11/2010 | Hall et al. | |
| 2011/0043049 A1 | 2/2011 | Karalis et al. | |
| 2011/0254379 A1 | 10/2011 | Madawala | |
| 2011/0267002 A1 | 11/2011 | Baarman et al. | |
| 2011/0285349 A1 | 11/2011 | Widmer et al. | |
| 2012/0206096 A1 | 4/2012 | John | |
| 2012/0169131 A1 | 7/2012 | Choudhary et al. | |
| 2012/0231731 A1 | 9/2012 | Kim et al. | |
| 2012/0293005 A1 | 11/2012 | Ryu et al. | |
| 2012/0313448 A1 | 12/2012 | Anttila | |
| 2013/0271069 A1 | 10/2013 | Partovi | |
| 2014/0054970 A1 | 2/2014 | Keeling et al. | |
| 2014/0070621 A9 | 3/2014 | Von Novak et al. | |
| 2014/0346888 A1 | 11/2014 | Kim et al. | |
| 2015/0054349 A1 | 2/2015 | Ishikuro et al. | |
| 2015/0097443 A1 | 4/2015 | Moyer et al. | |
| 2015/0200547 A1 | 7/2015 | Nakashima et al. | |
| 2016/0036243 A1 * | 2/2016 | Hayashi | H02J 50/12 307/104 |
| 2017/0179769 A1 | 6/2017 | Vijayan et al. | |
| 2020/0153286 A1 * | 5/2020 | Mao | H02J 50/12 |
| 2022/0224162 A1 | 7/2022 | Vijayan et al. | |

FOREIGN PATENT DOCUMENTS

| | | |
|---|---|---|
| WO | 00/54387 | 9/2000 |
| WO | 2006001557 | 1/2006 |
| WO | 2012169861 | 12/2012 |
| WO | 2014125392 | 8/2014 |

OTHER PUBLICATIONS

"Chinese Application No. 201611176286 First Office Action", Jan. 25, 2021, 8 pages.

"European Application 16203683.4 Communication Pursuant to Article 94(3) EPC", Jul. 20, 2020, 7 pages.

"European Application No. 16203683 European Search Report and Opinion", Apr. 25, 2017, 7 pages.

"European Application No. 16203683.4 Communication pursuant to Article 94(3) EPC 2021 02 25", Feb. 25, 2021, 8 pages.

"Korea Patent application No. 10-2022-0028277 Response to Final Rejection", Dec. 26, 2022, 3 pages.

"Korean Application No. 10-2016-0172609 Notification of Reason for Refusal", Jun. 25, 2021, 5 pages.

"Korean Application No. 10-2022-0028277 Notice of Submission of Opinion", Jun. 16, 2022, 5 pages.

"Patent application No. 22171142.7 in European Patent Office Extended European Search Report", Oct. 17, 2022, 33 pages.

"Qi System Description Wireless Power Transfer", Wireless Power Consortium, vol. 1:Low Power, Part 1:Interface Definition, Version 1.0.1, Oct. 2010, 88 pages.

"U.S. Appl. No. 15/375,789 Final Office Action", Nov. 12, 2020, 10 pages.

"U.S. Appl. No. 15/375,789 Final Office Action", Sep. 19, 2019, 12 pages.

"U.S. Appl. No. 15/375,789 Office Action", Feb. 6, 2019, 9 pages.

"U.S. Appl. No. 15/375,789 Office Action", May 1, 2020, 10 pages.

"U.S. Appl. No. 15/375,789 Office Action", Jun. 24, 2021, 9 pages.

"U.S. Appl. No. 17/707,819 Non Final Office Action", Jan. 30, 2023, 10 pages.

Moon, et al., "Analysis and Design of a Wireless Power Transfer System With an Intermediate Coil for High Efficiency", IEEE Transactions on Industrial Electronics, vol. 61, No. 11, pp. 5861-5870, Nov. 2014, 10 pages.

Park, et al., "Study on the Optimal Switching Frequency for Maximum Wireless Power Transfer in a Variable Airgap System", IEEE Journal of Emerging and Selected Topics in Power Electronics, vol. 3, No. 1, pp. 201-204, Mar. 2015, 4 pages.

* cited by examiner

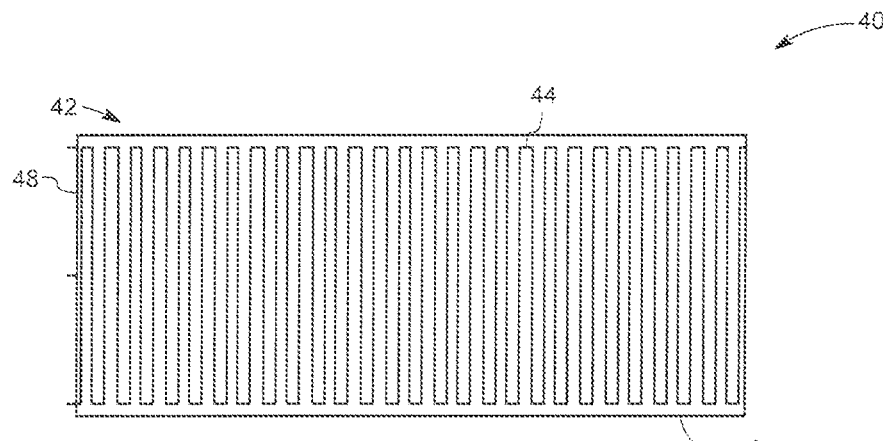
FIG. 2A
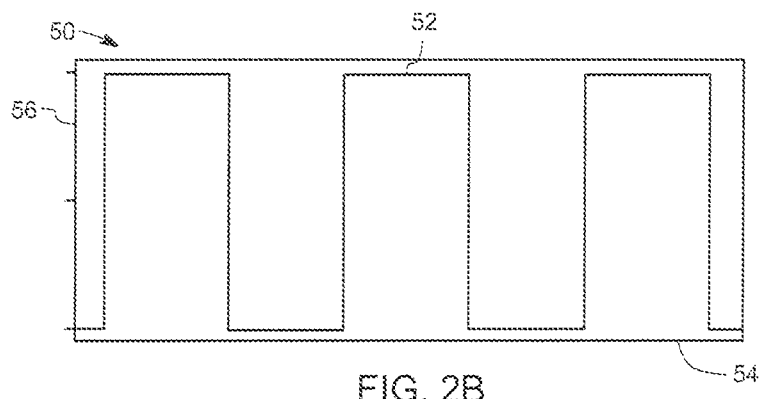
FIG. 2B
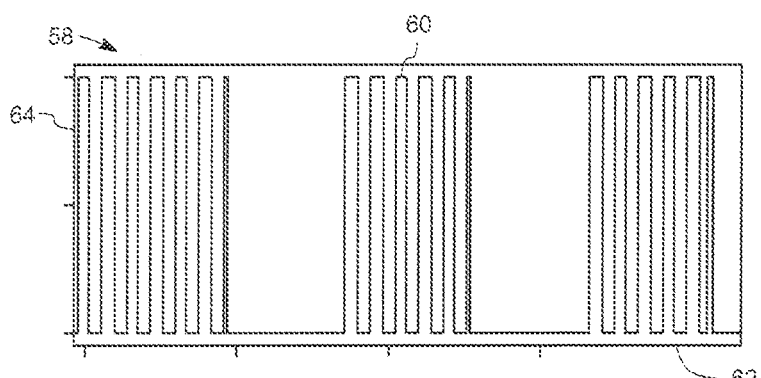
FIG. 2C
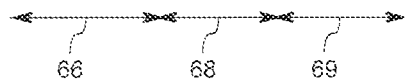

CONTACTLESS POWER TRANSFER SYSTEM AND METHOD FOR CONTROLLING THE SAME

BACKGROUND

Embodiments of the present specification relate to a power transfer system, and more particularly to a contactless power transfer system and method of controlling the same.

Contactless power transfer systems are used to transmit power from one location to another location without a physical connection such as wires between the two locations. The contactless power transfer systems may be classified as inductive coupling systems and resonance based coupling systems based on their principle of operations.

Inductive coupling systems are well known and work based on the principle of induction. However, in such inductive coupling systems, power can be transmitted only between two closely coupled coils. Further, the inductive coupling systems have poor power transmission efficiency.

The resonance based coupling systems employ resonant coils, which are operated at a system frequency to transmit power between the two locations via a magnetic field. Such resonance based coupling systems are used to transmit power over relatively long distances and are thus used in various applications. In such applications, the resonance based coupling systems are used to provide power to a load, where the system frequency varies based on a power rating of the load. Moreover, for applications of the resonance based coupling systems such as charging a battery, the system frequency may vary based on a required load power for charging the load. In such applications, the required load power varies for the same load during a single charging cycle; and the system frequency is varied during the single charging cycle for the same load based on the required load power at different instants of time in the single charging cycle. Such variations in the system frequency lead to undesirable effects on the power transmission efficiency of the resonance based coupling systems as the power transmission efficiency of the resonance based coupling systems is dependent on a frequency at which the resonant coils operate.

BRIEF DESCRIPTION

Briefly, in accordance with one aspect of the present specification, a contactless power transfer system is provided. The contactless power transfer system includes a first power exchanger coil configured to exchange power. The contactless power transfer system also includes a first power converter operatively coupled to the first power exchanger coil and configured to convert a direct current power to an alternating current power at a system frequency. The contactless power transfer system further includes a controller configured to control an operating state of the first power converter to vary an alternating current power provided to the first power exchanger coil at the system frequency.

In another aspect of the specification, a method for contactless power transfer is provided. The method includes operating a first power exchanger coil at a system frequency. The method also includes detecting a second power exchanger coil. The method further includes generating an alternating current power at the system frequency using a first power converter. The method also includes transferring the alternating current power from the first power exchanger coil to the second power exchanger coil at the system frequency via a magnetic field. The method further includes controlling a time period of an operating state of the first power converter operating at the system frequency for varying the alternating current power generated by the first power converter, wherein controlling the operating state of the first power converter comprises altering a first time period of an activated state of the first power converter and altering a second time period of a deactivated state of the first power converter to vary the alternating current power generated by the first power converter.

In yet another aspect of the specification, a contactless power transfer system is provided. The contactless power transfer system includes a first power converter configured to convert a direct current power received from a power source to an alternating current power at a system frequency. The contactless power transfer system also includes a first power exchanger coil operatively coupled to the first power converter and configured to receive the alternating current power from the first power converter. The contactless power transfer system further includes a second power exchanger coil configured to receive the alternating current power from the first power exchanger coil via a magnetic field at the system frequency. The contactless power transfer system also includes a second power converter operatively coupled to the second power exchanger coil and configured to convert the alternating current power to an output direct current power transmitted to a load. The contactless power transfer system further includes a sensor operatively coupled to the second power converter and configured to measure at least a voltage of the output direct current power. The contactless power transfer system further includes a controller operatively coupled to the first power converter and configured to control an operating state of the first power converter for varying the alternating current power generated by the first power converter based on at least a sensed voltage received from the sensor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2A is a graphical representation depicting a frequency signal for generating an alternating current power in the contactless power transfer system of FIG. 1, according to aspects of the present specification;

FIG. 2B is a graphical representation depicting a control signal for generating the alternating current power in the contactless power transfer system of FIG. 1, according to aspects of the present specification;

FIG. 2C is a graphical representation depicting a modulated signal for generating the alternating current power in the contactless power transfer system of FIG. 1, according to aspects of the present specification;

DETAILED DESCRIPTION

Aspects of the present specification include a contactless power transfer system and a method for contactless power transfer using the same. The contactless power transfer system includes a first power converter configured to convert a direct current power received from a power source to an alternating current power at a system frequency. As used herein, the term "system frequency" refers to a frequency at which the contactless power transfer system is operated. The contactless power transfer system also includes a first power exchanger coil operatively coupled to the first power converter and configured to receive the alternating current power from the first power converter. Further, the contactless power transfer system includes a second power exchanger coil configured to receive the alternating current power from the first power exchanger coil via a magnetic field, at the system frequency. Moreover, the contactless power transfer system also includes a second power converter operatively coupled to the second power exchanger coil and configured to convert the alternating current power to an output direct current power, where the direct current power may be transmitted to a load. Further, the contactless power transfer system further includes a sensor operatively coupled to a first node located between the second power converter and the load. The sensor is configured to sense at least a voltage or a current at the first node. The contactless power transfer system further includes a controller operatively coupled to the first power converter and configured to control an operating state of the first power converter for varying the alternating current power generated by the first power converter based on at least the sensed voltage or the sensed current received from the sensor.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "exchange" and "transfer" may be used interchangeably in the specification and convey the same meaning. Unless specified otherwise, the term "exchange" may be defined as a contactless exchange of power for the purposes of this specification.

Figure 1:
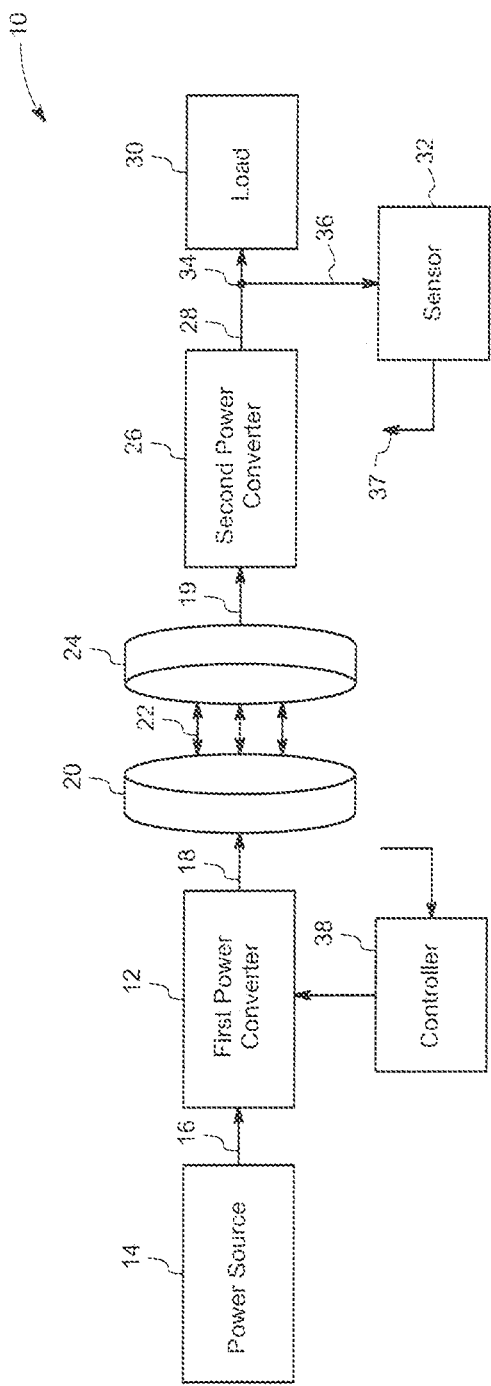
FIG. 1 is a block diagram representation of a contactless power transfer system, according to aspects of the present specification.

FIG. 1 is a block diagram representation of a contactless power transfer system 10, according to an aspect of the present specification. The contactless power transfer system 10 includes a first power exchanger coil 20 and a second power exchanger coil 24, where the contactless power transfer system 10 enables transfer of power from the first power exchanger coil to the second power exchanger coil 24. Further details of the operation of the contactless power transfer system 10 are discussed later in the specification.

The contactless power transfer system 10 includes a first power converter 12 operatively coupled to a direct current power source 14. The first power converter 12 receives a direct current power, generally represented by reference numeral 16, from the direct current power source 14 and converts the direct current power 16 to an alternating current power, generally represented by reference numeral 18, based on a system frequency of the contactless power transfer system 10. The first power converter 12 is operatively coupled to the first power exchanger coil and transmits the alternating current power 18 to the first power exchanger coil 20. The first power exchanger coil 20 receives the alternating current power 18 and generates a magnetic field 22 based on the received alternating current power 18. The contactless power transfer system 10 also includes the second power exchanger coil 24. The second power exchanger coil 24 located at a determined distance from the first power exchanger coil 20 receives the magnetic field 22 generated by the first power exchanger coil 20 and converts the magnetic field 22 to a corresponding alternating current power 19 representative of the alternating current power 18 generated by the first power converter 12. As used herein, the term "determined distance" refers to a distance up to which the alternating current power 18 is desired to be transmitted. In certain embodiments, the first power exchanger coil 20 and the second power exchanger coil 24 may be resonant coils. In one example, the first power exchanger coil 20 may transmit the magnetic field 22 to a plurality of second power exchanger coils 24. In another example, a plurality of first power exchanger coils 20 may transmit the magnetic field 22 to the second power exchanger coil 24. Each of the aforementioned configurations is applied based on the application, where contactless power transfer is used. For example, the first power exchanger coil 20 may act as a transmitter and may transfer power in a contactless fashion to the plurality of second power exchanger coils 24 disposed in corresponding devices. Further, each of the plurality of second power exchanger coils 24 may receive the alternating current power 19 simultaneously in a similar time interval or sequentially in same or different time intervals using modulation techniques.

Furthermore, the first power exchanger coil 20 and the second power exchanger coil 24 may be configured to operate as the transmitter coil or the receiver coil in different embodiments based on system requirements. In some embodiments, the first power exchanger coil 20 and the second power exchanger coil 24 may act as both transmitter and receiver simultaneously allowing for simultaneous bidirectional exchange of power, data, or both. In one embodiment, the contactless power transfer system 10 may further include a field focusing element (not shown in FIG. 1) to enhance magnetic coupling between the first power exchanger coil 20 and the second power exchanger coil 24. In same or different embodiment, one or more repeater resonators (not shown in FIG. 1) may be added to the contactless power transfer system 10 to increase the determined distance between the first power exchanger coil 20 and the second power exchanger coil 24 for contactless exchange of power. In some embodiments, the field focusing element, the one or more repeater resonators, or both may be operatively coupled to the first power exchanger coil 20, the second power exchanger coil 24, or a combination thereof.

Moreover, in the contactless power transfer system 10, the second power exchanger coil 24 is operatively coupled to a second power converter 26. The second power converter 26 is configured to receive the alternating current power 19 transmitted by the second power exchanger coil 24. Further, the second power converter 26 may convert the alternating current power 19 to an output direct current power 28 which is used to operate a load operatively coupled to the contactless power transfer system 10. During operation, power, also referred to as load power, is required to drive the load 30. The load power required by the load 30 may vary with time based on a condition of the load 30 at a particular time. For example, if the load 30 is a battery, which is discharged, the required load power for charging the battery may depend on the extent of discharge or charge expended by the battery. In particular, a required load power for charging the battery is higher when the battery is nearly discharged, as compared to the required load power for the battery when the battery is 90% to 95% charged, for example.

Further, a sensor 32 is operatively coupled at a first node 34 between the second power converter 26 and the load 30. The sensor 32 senses at least a voltage 36 at the first node 34. It may be noted that in some embodiments, the sensor 32 may be configured to sense other electrical parameters, such as but not limited to, current, at the node 34. A voltage at the first node 34 is induced based on the load power required by the load 30. Accordingly, the sensed voltage 36 at the node 34 is representative of the power required by the load 30. Further, a signal 37 representative of the sensed voltage 36 is transmitted to a controller 38 in the contactless power transfer system 10. In one embodiment, the contactless power transfer system 10 may include a data transmitter operatively coupled to the sensor 32 for transmitting the signal 37 representative of the sensed voltage 36 to the controller 38. Further, the contactless power transfer system 10 may include a data receiver operatively coupled to the controller 38 for receiving the signal 37 representative of the sensed voltage 36 from the data transmitter. In such embodiments, the signal 37 representative of the sensed voltage 36 is transmitted at a data frequency, which is different from the system frequency.

The controller 38 receives the sensed voltage 36 from the sensor 32 and computes the load power required by the load 30 based on the sensed voltage 36. Further, the controller 38 determines the output direct current power 28, which is equivalent to the required load power. Moreover, based on the determined output direct current power 28 that is required to drive the load 30, the controller 38 computes the alternating current power 18 that is required to be generated by the first power converter 12. In some embodiments, a processing unit (not shown in FIG. 1) may be operatively coupled to the controller 38, the sensor 32, or both for computing the required load power, the output direct current power 28, or the alternating current power 18 that is required to be generated by the first power converter 12 based on the sensed voltage 36. Further, in some of these embodiments, a signal representative of the load power, the output direct current power 28, or the alternating current power 18 required to be generated by the first power converter 12 may be transmitted by the processing unit to the controller 38 based on which the controller may control the first power converter 12. Based on the alternating current power 18 that needs to be generated by the first power converter 12, the controller 38 controls an operating state of the first power converter 12 to facilitate generation of the required alternating current power 18. The operating state may be an activated state of the first power converter 12 or a deactivated state of the first power converter 12. Furthermore, the controller 38 controls a first time period associated with the activated state of the first power converter 12 and the second time period associated with the deactivated state of the first power converter 12.

As used hereinabove, the term "activated state" may be defined as a state of the first power converter 12, in which the first power converter 12 generates the alternating current power 18 at the system frequency. Such activated state is different from a duty cycle modulation technique such as a pulse width modulation technique. The first time period of the activated state is dependent on the load power required by the load and may vary based on the load power requirement. In contrast, the duty cycle modulation technique includes a fixed duty cycle, which further includes an "ON" time interval and an "OFF" time interval, which may be varied within the fixed duty cycle. Therefore, the first time period of the activated state is different from the duty cycle, thereby making the activated state different from the duty cycle modulation.

Similarly, as used hereinabove, the term "deactivated state" may be defined as a state of the first power converter 12, in which the first power converter 12 does not generate the alternating current power 18. Such deactivated state is different from the duty cycle modulation technique such as the pulse width modulation technique. The second time period of the deactivated state is dependent on the load power required by the load and may vary based on the load power requirement. In contrast, the duty cycle modulation technique includes the fixed duty cycle, which further includes the "ON" time interval and the "OFF" time interval, which may be varied within the fixed duty cycle. Therefore, the second time period of the deactivated state is different from the duty cycle, thereby making the deactivated state different from the duty cycle modulation.

The controller 38 operates the first power converter 12 at the system frequency and alters the first time period and the second time period for generating pulses of alternating current power 18, which are transmitted to the second power exchanger coil 24 by the first power exchanger coil 20. Such a configuration allows the contactless power transfer system 10 to operate at a fixed system frequency for different values of required load power, thereby improving a power transfer efficiency of the contactless power transfer system 10. In one embodiment, the required output direct current power 28 is an average of the pulses of the alternating current power 18 generated by the first power converter 12. Further details of the operation of the contactless power transfer system are discussed below.

FIG. 2A-2C are graphical representations depicting a system frequency signal for generating the alternating current power 18 in a contactless power transfer system 10 of FIG. 1. Referring to FIG. 2A the graph 42 represents a system frequency 44, where X axis 46 of the first graph represents time and Y axis 48 represents a system frequency 44.

In FIG. 2B the graph 50 represents a control signal 52 for controlling an operating state of the first power converter 12 of FIG. 1, where X axis 54 represents time and Y axis 56 represents an operating state of the first power converter 12.

Referring to FIG. 2C, the third graph 58 represents a modulated signal 60 based on the system frequency 44 and the control signal 52, where X axis 62 represents time and Y axis 64 represents the modulation signal 60.

From a combined reading of the first graph 42, the second graph 50, and the third graph 58, it can be seen that the first power converter 12 is operated in an activated state at the system frequency 44 for a first time interval 66. Furthermore, in a second time interval 68, the first power converter 12 is operated in a deactivated state, where no alternating current power is generated by the first power converter 12. Subsequently, in a third time interval 69, the first power converter 12 is again operated in the activated state, thereby generating alternating current power 18 at the system frequency 44. Such time intervals 66, 68, 69 are controlled by the controller 38 to vary the alternating current power 18 generated by the first power converter 12 based on the power required by a load.

Figure 3:
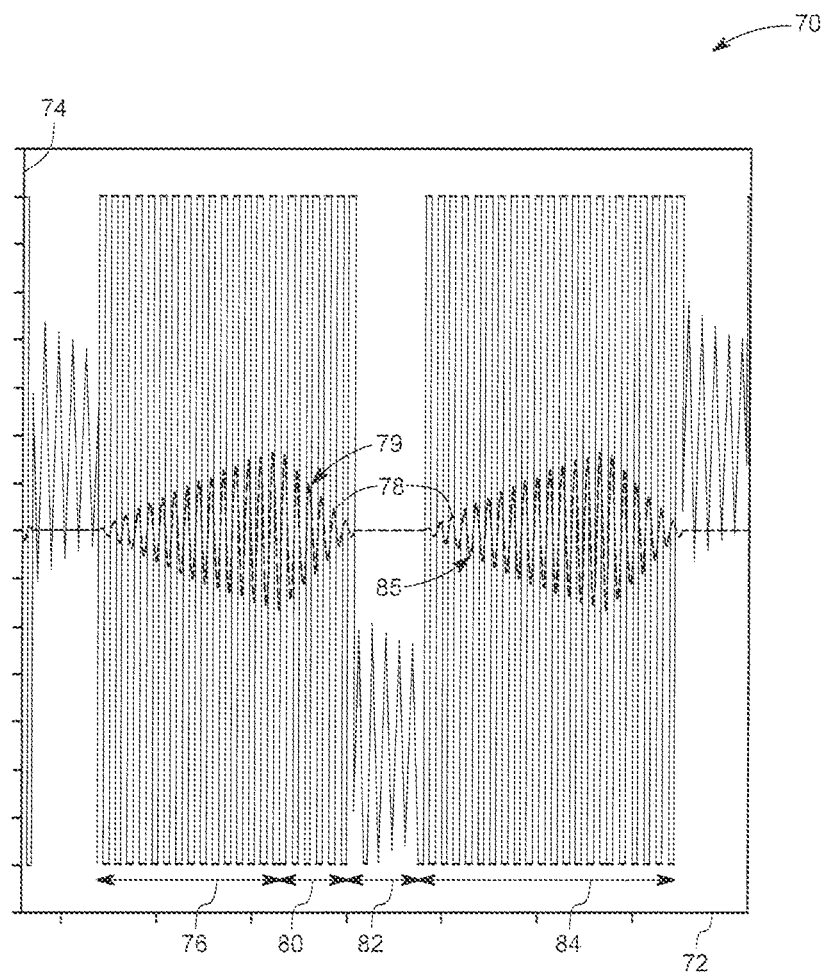
FIG. 3 is an exemplary graphical representation depicting simulations performed to generate 2.8 kilowatts of alternating current power using a first power converter in the contactless power transfer system of FIG. 1, according to aspects of the present specification.

FIG. 3 is an exemplary graphical representation 70 for a method of generating the alternating current power 18 using the first power converter 12, according to aspects of the present specification. The graphical representation 70 depicts simulations performed to generate 2.8 kilowatts of alternating current power 18 using the first power converter 12, where X axis 72 represents time in milliseconds and Y axis 74 represents converter voltage in volts.

As illustrated, in a first time interval 76, the first power converter 12 is operated in an activated state, which generates a current 78 at an output of the first power converter 12, thereby generating a first pulse 79 of the alternating current power 18. Further, upon initiation of a deactivation state of the first power converter 12 by the controller 38, the current 78 in the first power converter 12 decays during a transition time period 80.

During a second time interval 82, the first power converter 12 is in the deactivated state, where the current 78 is zero. Similarly, in a third time interval 84, the first power converter 12 is again operated in the activated state, thereby generating the current 78 at the output of the first power converter 12. Therefore, the first power converter 12 generates a second pulse 85 of the alternating current power 18 in the third time interval 84. The first pulse 79 and the second pulse 85 provides the desired alternating current power 18 to the first power exchanger coil 20.

The controller 38 controls a duration of the time intervals 76, 82, and 84 depicting the activated state and the deactivated state of the first power converter 12 to generate the desired alternating current power 18 at the system frequency 44 (see FIG. 2A).

Figure 4:
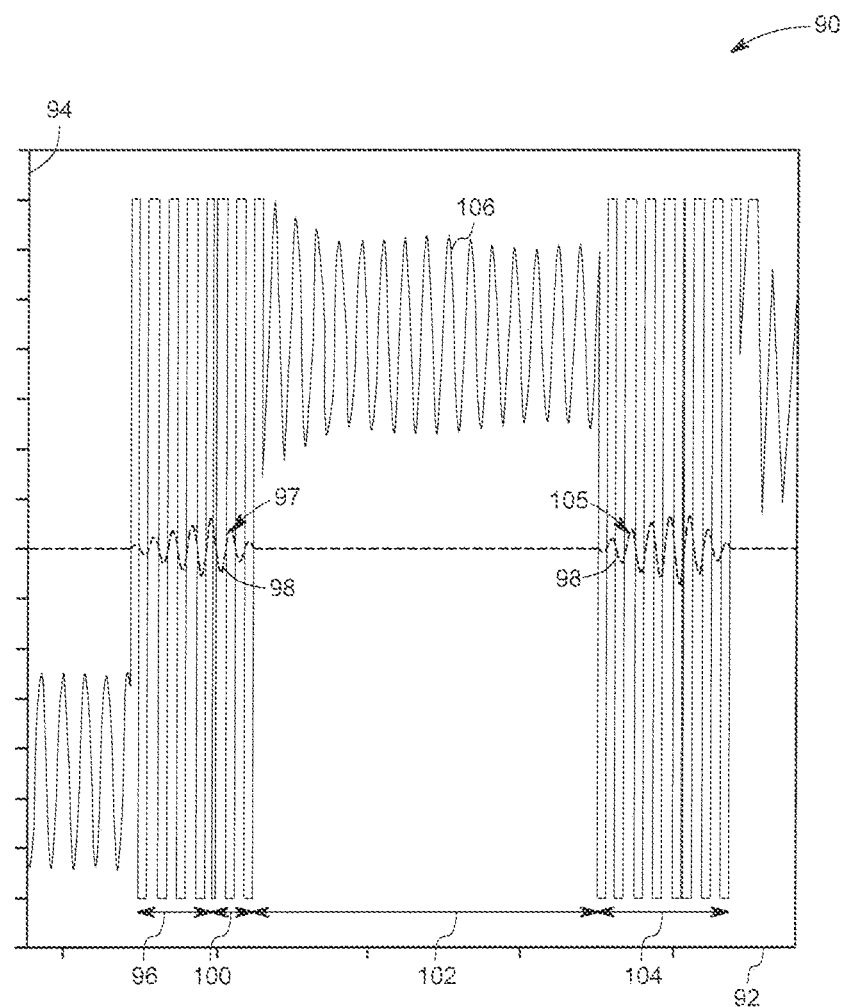
FIG. 4 is an exemplary graphical representation depicting simulations performed to generate 280 watts of alternating current power using a first power converter in the contactless power transfer system of FIG. 1, according to aspects of the present specification.

FIG. 4 represents another exemplary graphical representation 90 depicting simulations performed to generate 280 watts of alternating current power 18 using the first power converter 12. In the graphical representation 90, X axis 92 represents time in milliseconds and Y axis 94 represents the first converter voltage in volts.

As can be seen, in a first time interval 96, the first power converter 12 is operated in an activated state, which generates a current 98 at an output of the first power converter 12, thereby generating a first pulse 97 of the alternating current power 18. Furthermore, upon initiation of a deactivation state of the first power converter 12, the current 98 in the first power converter 12 decays during a transition time period 100. It may be noted that the first time interval 96 in the graphical representation 90 is less than the first time interval 76 in the graphical representation 70, which enables the controller 38 to control the first power converter 12 to generate less alternating current power 18 in the first pulse 97 in comparison to the first pulse 79 of FIG. 3.

During a second time interval 102, the first power converter 12 is in the deactivated state, where the current 98 is zero. It may be noted that the second time interval 102 in that graphical representation 90 is more than the second time interval 82 in graphical representation 70. Furthermore, in a third time interval 104, the first power converter 12 is again operated in the activated state, thereby generating the current 98 at the output of the first power converter 12. The first power converter generates a second pulse 105 of the alternating current power 18 during the third time interval 104. It may be noted that the first time interval 96 and the third time interval 104 in the graphical representation 90 are lesser than the first time interval 76 and the third time interval 84 in the graphical representation 70, which enables the controller 38 to control the first power converter 12 to generate lesser alternating current power 18 in the first pulse 97 and the second pulse 105 in comparison to the first pulse 79 and second pulse 85 of FIG. 3.

Figure 5:
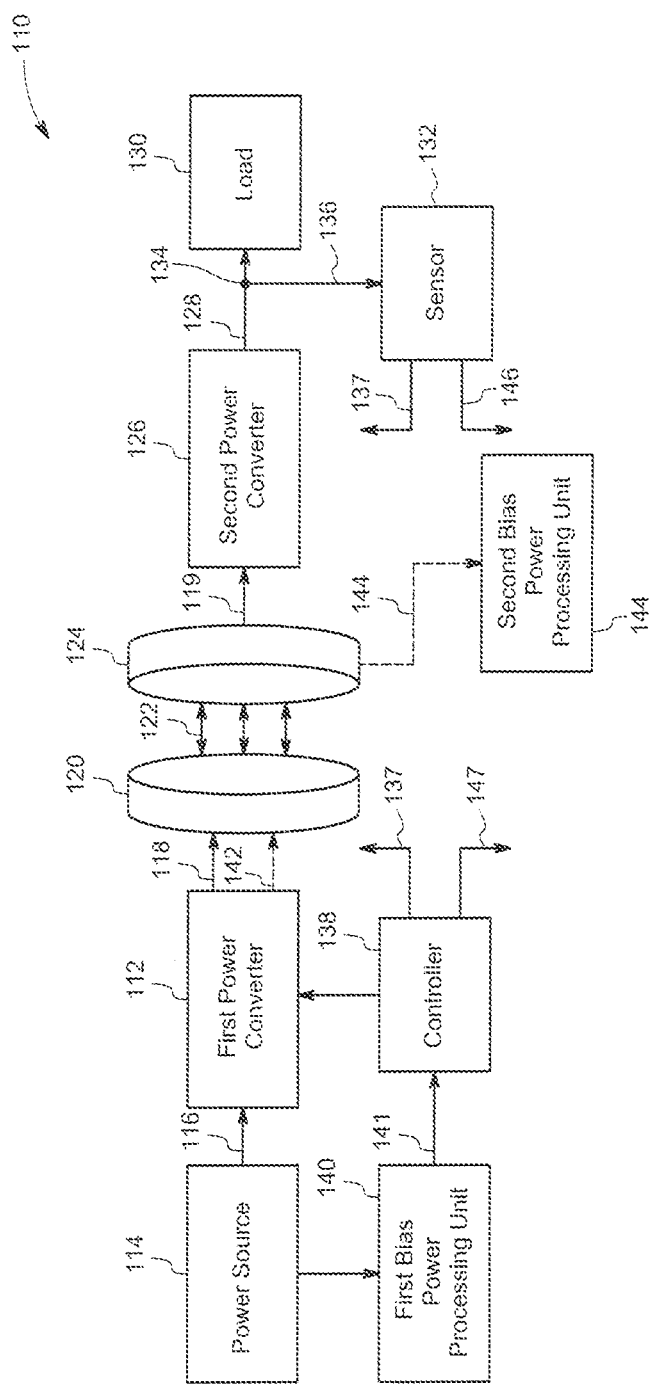
FIG. 5 is a block diagram representation of an embodiment of a contactless power transfer system of FIG. 1 configured to detect a second power exchanger coil, according to aspects of the present specification.

FIG. 5 is a block diagram representation of an embodiment of a contactless power transfer system 110, according to aspects of the present specification. The contactless power transfer system 110 includes a first power exchanger coil 120 and a second power exchanger coil 124, where the contactless power transfer system 110 enables transfer of power from the first power exchanger coil 120 to the second power exchanger coil 124. Further details of the operation of the contactless power transfer system 110 are discussed later in the specification.

The contactless power transfer system 110 includes a first power converter 112 operatively coupled to a direct current power source 114. The first power converter 112 receives a direct current power, generally represented by reference numeral 116, from the direct current power source 114 and converts the direct current power 116 to an alternating current power, generally represented by reference numeral 118 based on a system frequency of the contactless power transfer system 110. The first power converter 112 is operatively coupled to a first power exchanger coil 120 and transmits the alternating current power 118 to the first power exchanger coil 120. The first power exchanger coil 120 receives the alternating current power 118 and generates a magnetic field 122 based on the alternating current power 118. The contactless power transfer system 110 also includes the second power exchanger coil 124. The second power exchanger coil 124 located at a determined distance from the first power exchanger coil 120 receives the magnetic field 122 generated by the first power exchanger coil 120 and converts the magnetic field 122 to a corresponding alternating current power 119 representative of the alternating current power 118 generated by the first power converter 112. The second power exchanger coil 124 receives the magnetic field 122 generated by the first power exchanger coil 120 and converts the magnetic field 122 to the alternating current power 119 representative of the alternating current power 118 generated by the first power converter 112. Further, the second power exchanger coil 124 is operatively coupled to a second power converter 126. The second power converter 126 is configured to receive the alternating current power 119 transmitted by the second power exchanger coil 124 and convert the alternating current power 119 to an output direct current power 128, which is used to operate a load 130 operatively coupled to the contactless power transfer system 110.

Further, a sensor 132 is operatively coupled at a first node 134 between the second power converter 126 and the load 130. The sensor senses at least a voltage 136 at the first node 134. Moreover, a signal 137 representative of the sensed voltage 136 is transmitted to a controller 138 in the contactless power transfer system 110. The controller 138 receives the signal 137 representative of the sensed voltage 136 from the sensor 132 and computes the load power required by the load 130 based on the sensed voltage 136. Furthermore, the controller 138 determines the output direct current power 128, which is equivalent to the required load power. Moreover, based on the output direct current power 128 that is required to drive the load 130, the controller 138 computes the alternating current power 118 that is required to be generated by the first power converter 112. Based on the alternating current power 118 that needs to be generated by the first power converter 112, the controller 138 controls an operating state of the first power converter 112 to generate the required alternating current power 118. The operating state may be an activated state of the first power converter 112 or a deactivated state of the first power converter 112. Furthermore, the controller 138 controls a first time period associated with the activated state of the first power converter 112 and the second time period associated with the deactivated state of the first power converter 112.

The contactless power transfer system 110 further includes a first bias processing unit 140 operatively coupled to the controller 138. The first bias processing unit 140 is configured to provide an operating power 141 to the controller 138 from the power source 114. During an idle state of the contactless power transfer system 110, the controller 138 controls the first power converter 112 to generate a bias power, which is transmitted to the second power exchanger coil 124 via the first power exchanger coil 120. As used hereinabove, the term "bias power" may be defined as a power which is lower than the alternating current power transmitted during operation of the contactless power transfer system 110. Such bias power is used for the purpose of detecting a second power exchanger coil 124 in the contactless power transfer system 110 during the idle state of the contactless power transfer system 110 and forms a portion of the alternating current power 118 transmitted to the second power exchanger coil 124 during operation of the contactless power transfer system 110. Furthermore, the contactless power transfer system 110 also includes a second bias processing unit 144 operatively coupled to the second power exchanger coil 124, where the second bias processing unit 144 is configured to receive a bias power 143, representative of the bias power 142 from the first power exchanger coil 120 via the second power exchanger coil 124. The second bias processing unit 144 receives the bias power 143 from the second power exchanger coil 124, which is further used to activate the sensor 132 for measuring the voltage at the first node 134. The bias power 143 is also used to generate a signal 146 representative of at least the sensed voltage 136 and transmit the signal 146 to the controller 138. In one embodiment, the contactless power transfer system 110 may include a wireless communication kit, which may be energized using the bias power 142 to generate and transmit the signal 146 to the controller 138. The controller 138 receives the signal 147, representative of the signal 146 and recognizes that the second power exchanger coil 124 is available for transferring power.

Figure 6:
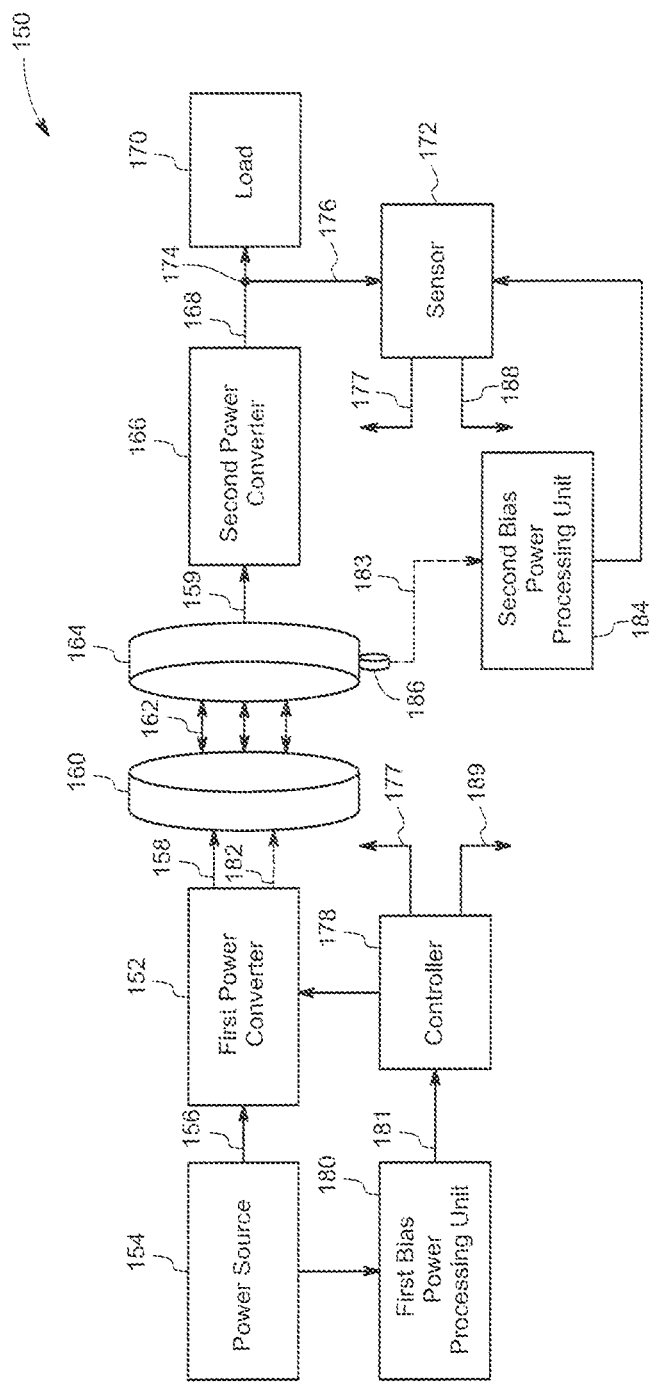
FIG. 6 is a block diagram representation of another embodiment of the contactless power transfer system of FIG. 5 including a bias coil configured to detect the second power exchanger coil, according to aspects of the present specification.

FIG. 6 is a block diagram representation of an embodiment of a contactless power transfer system 150 of the present specification. The contactless power transfer system 150 includes a first power exchanger coil 160 and a second power exchanger coil 164, where the contactless power transfer system 150 enables transfer of power from the first power exchanger coil 160 to the second power exchanger coil 164. Further details of the operation of the contactless power transfer system 150 are discussed later in the specification.

The contactless power transfer system 150 includes a first power converter 152 operatively coupled to a direct current power source 154. The first power converter 152 receives a direct current power, generally represented by reference numeral 156, from the direct current power source 154 and converts the direct current power 156 to an alternating current power, generally represented by reference numeral 158 based on a system frequency. The first power converter 152 is operatively coupled to the first power exchanger coil 160 and transmits the alternating current power 158 to the first power exchanger coil 160. The first power exchanger coil 160 receives the alternating current power 158 and generates a magnetic field 162 based on the alternating current power 158. The contactless power transfer system 150 also includes the second power exchanger coil 164. The second power exchanger coil 164 located at a determined distance from the first power exchanger coil 160 receives the magnetic field 162 generated by the first power exchanger coil 160 and converts the magnetic field 162 to a corresponding alternating current power 159 representative of the alternating current power 158 generated by the first power converter 152. The second power exchanger coil 164 receives the magnetic field 162 generated by the first power exchanger coil 160 and converts the magnetic field 162 to the alternating current power 159 representative of the alternating current power 158 generated by the first power converter 152. Further, the second power exchanger coil 164 is operatively coupled to a second power converter 166. The second power converter 166 is configured to receive the alternating current power 158 transmitted by the second power exchanger coil 164 and convert the alternating current power 159 to an output direct current power 168, which is used to operate a load 170 operatively coupled to the contactless power transfer system 150.

Further, a sensor 172 is operatively coupled at a first node 174 between the second power converter 166 and the load 170. The sensor 172 senses at least a voltage 176 at the first node 174. Moreover, a signal 177 representative of the sensed voltage 176 is transmitted to a controller 178 in the contactless power transfer system 150. The controller 178 receives the signal 177 representative of the sensed voltage 176 from the sensor 172 and computes the load power required by the load 170 based on the sensed voltage 176. Furthermore, the controller 178 determines the output direct current power 168, which is equivalent to the required load power. Moreover, based on the output direct current power 168 that is required to drive the load 170, the controller 178 computes the alternating current power 158 that is required to be generated by the first power converter 152. Based on the alternating current power 158 that needs to be generated by the first power converter 152, the controller 178 controls an operating state of the first power converter 152 to generate the required alternating current power 158. The operating state may be an activated state of the first power converter 152 or a deactivated state of the first power converter 152. Furthermore, the controller 178 controls a first time period associated with the activated state of the first power converter 152 and the second time period associated with the deactivated state of the first power converter 152.

The contactless power transfer system 150 further includes a first bias processing unit 180 operatively coupled to the controller 178. The first bias processing unit 180 is configured to provide an operating power 181 to the controller 178 from the power source 154. The operating power 181 is used to operate the controller 178. During an idle state of the contactless power transfer system 150, the controller 178 controls the first power converter 152 to generate a bias power 182, which is transmitted to the second power exchanger coil 164 via the first power exchanger coil 160. Furthermore, the contactless power transfer system 150 also includes a second bias processing unit 184 operatively coupled to the second power exchanger coil 164, where the second bias processing unit 184 is configured to receive the bias power 183, representative of the bias power 182 received from the first power exchanger coil 160. The contactless power transfer system 150 also includes a bias coil 186 operatively coupled to the second power exchanger coil 164 and the second bias processing unit 184, where the bias coil 186 is configured to receive the bias power 183 from the first power exchanger coil 160 and transmit the bias power 183 to the second bias processing unit 184. The second bias processing unit 184 receives the bias power 183 from the second power exchanger coil 164, which is further used to activate the sensor 172 for measuring the voltage at the first node 174. The bias power 183 is also used to generate a signal 188 representative of at least the sensed voltage 176 and transmit the signal 188 to the controller 178. In one embodiment, the contactless power transfer system 150 may include a wireless communication kit, which may be energized using the bias power 183 to generate and transmit the signal 188 to the controller 178. The controller 178 receives a signal 189, representative of the signal 188 and recognizes that the second power exchanger coil 164 is available for transferring power.

Figure 7:
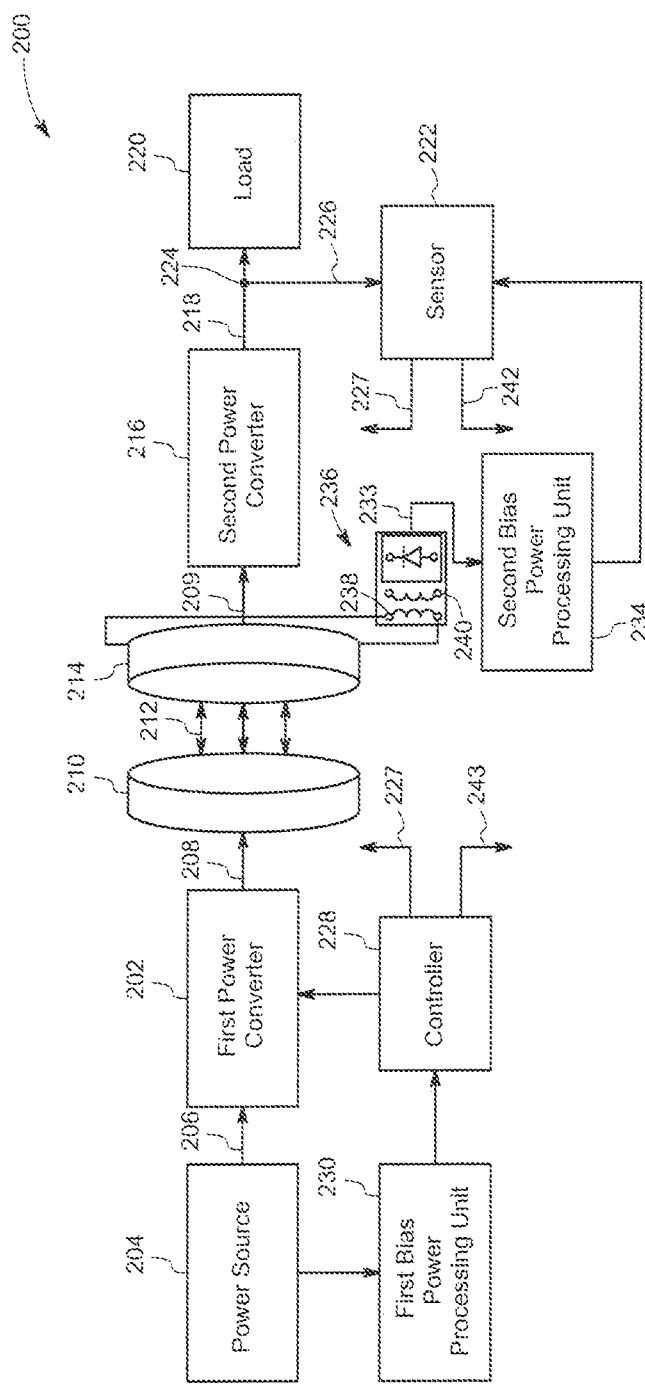
FIG. 7 is a block diagram representation of yet another embodiment of the contactless power transfer system of FIG. 5 including a bias transformer configured to detect the second power exchanger coil, according to aspects of the present specification.

FIG. 7 is a block diagram representation of an embodiment of a contactless power transfer system 200, according to aspects of the present specification. The contactless power transfer system 200 includes a first power exchanger coil 210 and a second power exchanger coil 214, where the contactless power transfer system 200 enables transfer of power from the first power exchanger coil 210 to the second power exchanger coil 214. Further details of the operation of the contactless power transfer system 200 are discussed later in the specification.

The contactless power transfer system 200 includes a first power converter 202 operatively coupled to a direct current power source 204. The first power converter 202 receives a direct current power, generally represented by reference numeral 206, from the direct current power source 204 and converts the direct current power 206 to an alternating current power, generally represented by reference numeral 208 based on a system frequency. The first power converter 202 is operatively coupled to the first power exchanger coil 210 and transmits the alternating current power 208 to the first power exchanger coil 210. The first power exchanger coil 210 receives the alternating current power 208 and generates a magnetic field 212 based on the alternating current power 208. The contactless power transfer system 200 also includes the second power exchanger coil 214. The second power exchanger coil 214 located at a determined distance from the first power exchanger coil 210 receives the magnetic field 212 generated by the first power exchanger coil 210 and converts the magnetic field 212 to a corresponding alternating current power 209 representative of the alternating current power 208 generated by the first power converter 202. The second power exchanger coil 214 receives the magnetic field 212 generated by the first power exchanger coil 210 and converts the magnetic field 212 to the alternating current power 209 representative of the alternating current power 208 generated by the first power converter 202. Further, the second power exchanger coil 214 is operatively coupled to a second power converter 216. The second power converter 216 is configured to receive the alternating current power 208 transmitted by the second power exchanger coil 214 and convert the alternating current power 209 to an output direct current power 218, which is used to operate a load 220 operatively coupled to the contactless power transfer system 200.

Further, a sensor 222 is operatively coupled at a first node 224 between the second power converter 216 and the load 220. The sensor 222 senses at least a voltage 226 at the first node 224. Moreover, a signal 227 representative of the sensed voltage 226 is transmitted to a controller 228 in the contactless power transfer system 200. The controller 228 receives the signal 227 representative of the sensed voltage 226 from the sensor 222 and computes the load power required by the load 220 based on the sensed voltage 226. Furthermore, the controller 228 determines the output direct current power 218, which is equivalent to the required load power. Moreover, based on the output direct current power 218 that is required to drive the load 220, the controller 228 computes the alternating current power 208 that is required to be generated by the first power converter 202. Based on the alternating current power 208 that needs to be generated by the first power converter 202, the controller 228 controls an operating state of the first power converter 202 to generate the required alternating current power 208. The operating state may be an activated state of the first power converter 202 or a deactivated state of the first power converter 202. Furthermore, the controller 228 controls a first time period associated with the activated state of the first power converter 202 and the second time period associated with the deactivated state of the first power converter 202.

The contactless power transfer system 200 further includes a first bias processing unit 230 operatively coupled to the controller 228. The first bias processing unit 230 is configured to provide an operating power to the controller 228 from the power source 204. During an idle state of the contactless power transfer system 200, the controller 228 controls the first power converter 202 to generate a bias power 232, which is transmitted to the second power exchanger coil 214 via the first power exchanger coil 210. Furthermore, the contactless power transfer system 200 also includes a second bias processing unit 234 operatively coupled to the second power exchanger coil 214, where the second bias processing unit 234 is configured to receive the bias power 232 received from the first power exchanger coil 210. The contactless power transfer system 200 also includes a bias transformer 236. The bias transformer 236 includes a primary winding 238 operatively coupled to the second power exchanger coil 214 and configured to receive the bias power 232 from the first power exchanger coil 210. The bias transformer 236 also includes a secondary winding 240 operatively coupled to the second bias processing unit 234 and configured to transmit the bias power 232 to the second bias processing unit 234. In one embodiment, the second bias processing unit 234 may include a switched-mode power supply. The second bias processing unit 234 receives the bias power 233 from the second power exchanger coil 214, which is further used to activate the sensor 222 for measuring the voltage at the first node 224. The bias power 233 is also used to generate a signal 242 representative of at least the sensed voltage 226 and transmit the signal 242 to the controller 228. In one embodiment, the contactless power transfer system 200 may include a wireless communication kit, which may be energized using the bias power 233 to generate and transmit the signal 242 to the controller 228. The controller 228 receives a signal 243, representative of the signal 243 and recognizes that the second power exchanger coil 164 is available for transferring power.

Figure 8:
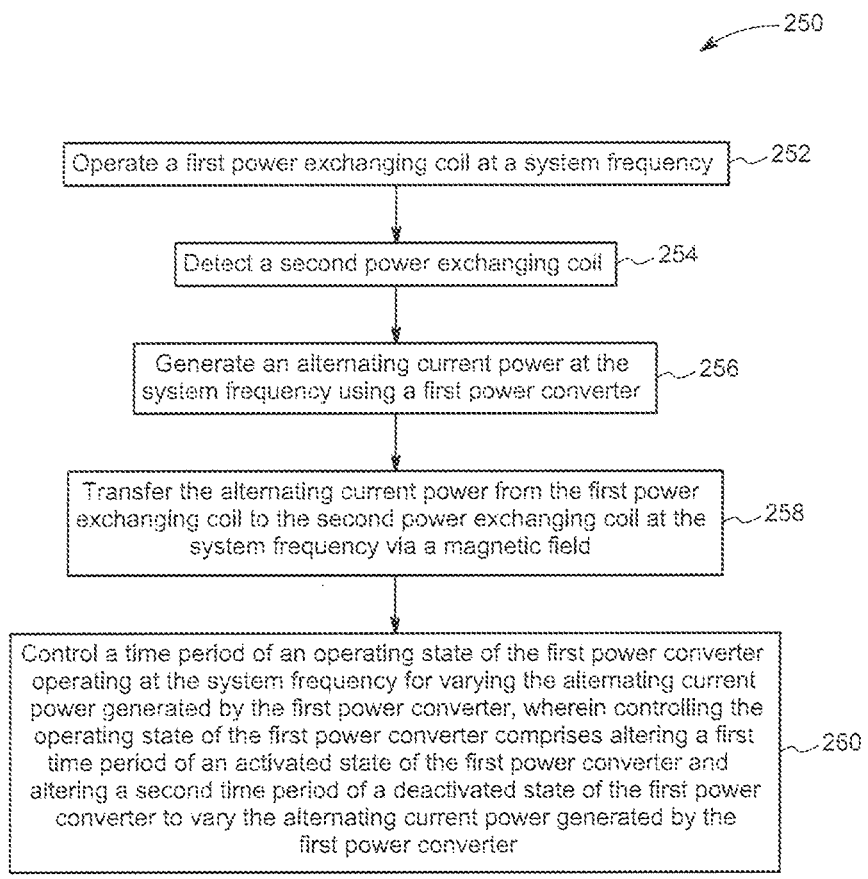
FIG. 8 is a flow chart representing steps involved in a method for contactless power transfer using the contactless power transfer system, according to aspects of the present specification.

FIG. 8 is a flow chart representing steps involved in a method 250 for contactless power transfer using a contactless power transfer system of the present specification, such as the contactless power transfer system 110 of FIG. 5, according to aspects of the present specification. The method 250 includes operating a first power exchanger coil 120 at a system frequency in step 252. The method 250 also includes detecting a second power exchanger coil 124 in step 254. In one embodiment, a bias power using a first bias processing unit 140 is generated and the bias power 142 is transmitted from the first power exchanger coil 120 to the second power exchanger coil 124. In another embodiment, the bias power from the first power exchanger coil 120 is received using a second bias processing unit 144 and a signal 146 representative of a detected second power exchanger coil 124 is transmitted to a controller 138.

The method 250 further includes generating an alternating current power 118 at the system frequency using a first power converter 112 in step 256. The method 250 also includes transferring the alternating current power 118 from the first power exchanger coil 120 to the second power exchanger coil 124 at the system frequency via a magnetic field 122 in step 258. The method 250 further includes controlling a time period of an operating state of the first power converter 112 using the controller 138 for varying the alternating current power 118 generated by the first power converter 112, wherein controlling the operating state of the first power converter 112 comprises altering a first time period of an activated state of the first power converter 112 and altering a second time period of a deactivated state of the first power converter 112 to vary the alternating current power 118 generated by the first power converter 112 in step 260. In one embodiment, the time period of the operating state of the first power converter 112 is controlled based on a load power required by a load 130 for varying the alternating current power 118 generated by the first power converter 112. In another embodiment, a voltage at a first node 134 located between the second power exchanger coil 124 and the load 130 is sensed and the alternating current power 118 is varied based on at least a sensed voltage 136.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this specification. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for contactless power transfer, the method comprising:
    generating an alternating current (AC) power;
    transmitting, by a first power exchanger coil, the AC power during a plurality of intermittent first time periods of an activated state in which the first power exchanger coil is configured to transmit the AC power to a wireless power receiving device via a magnetic field, wherein each first time period of the plurality of intermittent first time periods is followed by a second time period of a deactivated state in which the first power exchanger coil does not transmit the AC power; and
    changing a duration of one or more of the plurality of intermittent first time periods in response to a change in a power requirement of the wireless power receiving device.

2. The method of claim 1, wherein generating the AC power comprises generating the AC power at a fixed frequency.

3. The method of claim 2, wherein the fixed frequency remains constant for different power requirements of the wireless power receiving device.

4. The method of claim 1, further comprising:
    controlling a duration of the plurality of intermittent first time periods based on the power requirement of the wireless power receiving device.

5. The method of claim 4, wherein the power requirement is associated with a load of the wireless power receiving device.

6. The method of claim 4, wherein an amount of power transfer is controlled by varying the duration of the plurality of intermittent first time periods.

7. The method of claim 4, wherein controlling the duration of the plurality of intermittent first time periods comprises generating pulses of the AC power such that an average of the pulses satisfies the power requirement.

8. The method of claim 4, wherein controlling the duration of the plurality of intermittent first time periods comprises:
    controlling the duration of the plurality of intermittent first time periods based, at least in part, on a direct current power measured at a first node located between a second power exchanger coil of the wireless power receiving device and a load of the wireless power receiving device.

9. The method of claim 8, further comprising:
    receiving, via a wireless communication unit, a communication from the wireless power receiving device that indicates at least a voltage indicative of the direct current power measured at the first node.

10. A contactless power transfer system comprising:
    a power converter configured to generate an alternating current (AC) power;
    a first power exchanger coil operatively coupled with the power converter and configured receive the AC power from the power converter and to transmit the AC power to a wireless power receiving device via a magnetic field; and
    a controller operatively coupled with the power converter and configured to:
        control a duration of a plurality of intermittent first time periods of an activated state in which the first power exchanger coil is configured to transmit the AC power to the wireless power receiving device, wherein each first time period of the plurality of intermittent first time periods is followed by a second time period of a deactivated state in which the first power exchanger coil does not transmit the AC power, and change the duration of one or more of the plurality of intermittent first time periods in response to a change in a power requirement of the wireless power receiving device.

11. The contactless power transfer system of claim 10, wherein the power converter generates the AC power at a fixed frequency.

12. The contactless power transfer system of claim 11, wherein the fixed frequency remains constant for different power requirements of the wireless power receiving device.

13. The contactless power transfer system of claim 10, wherein the controller is further configured to control the duration of the plurality of intermittent first time periods based on the power requirement of the wireless power receiving device.

14. The contactless power transfer system of claim 13, wherein the power requirement is associated with a load of the wireless power receiving device.

15. The contactless power transfer system of claim 13, wherein the controller is further configured to control an amount of power transferred by varying the duration of the plurality of intermittent first time periods.

16. The contactless power transfer system of claim 13, wherein the controller is configured to generate pulses of the AC power such that an average of the pulses satisfies the power requirement.

17. The contactless power transfer system of claim 13, wherein the controller is configured to control the duration of intermittent first time periods based, at least in part, on a direct current power measured at a first node located between a second power exchanger coil of the wireless power receiving device and a load of the wireless power receiving device.

18. The contactless power transfer system of claim 17, further comprising:

a wireless communication unit configured to receive a communication from the wireless power receiving device that indicates at least a voltage indicative of the direct current power measured at the first node.

* * * * *